United States Patent
Chee et al.

(10) Patent No.: US 9,582,259 B2
(45) Date of Patent: Feb. 28, 2017

(54) METHOD AND APPARATUS FOR PROVIDING TEMPLATE-BASED APPLICATIONS

(71) Applicants: Wei-Ming Chee, Espoo (FI); Thomas Molgaard, Espoo (FI); Robert Haitani, Espoo (FI); Daniel Risi, Espoo (FI); Mauro Teofilo, Espoo (FI); Moises Carvalho, Espoo (FI)

(72) Inventors: Wei-Ming Chee, Espoo (FI); Thomas Molgaard, Espoo (FI); Robert Haitani, Espoo (FI); Daniel Risi, Espoo (FI); Mauro Teofilo, Espoo (FI); Moises Carvalho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 646 days.

(21) Appl. No.: 13/645,803

(22) Filed: Oct. 5, 2012

(65) Prior Publication Data
US 2014/0040854 A1  Feb. 6, 2014

Related U.S. Application Data

(60) Provisional application No. 61/679,389, filed on Aug. 3, 2012.

(51) Int. Cl.
*G06F 9/44* (2006.01)
*G06F 9/445* (2006.01)
*H04M 1/725* (2006.01)

(52) U.S. Cl.
CPC ............ *G06F 8/61* (2013.01); *G06F 9/44526* (2013.01); *H04M 1/72525* (2013.01)

(58) Field of Classification Search
CPC ........ G06F 8/61; G06F 21/562; G06F 21/566; G06F 21/57
See application file for complete search history.

(56) References Cited

U.S. PATENT DOCUMENTS 7,890,607 B2 *  2/2011  Fujii ............................. 709/219
8,694,988 B2 *  4/2014  Goldman ...................... 717/174
(Continued)

FOREIGN PATENT DOCUMENTS

EP           1435743 A1    7/2004
WO      2012/001456 A2    1/2012

OTHER PUBLICATIONS

Nilsson et al., Key management and secure software updates in wireless process control environments, Mar. 2008, 9 pages.*

(Continued)

*Primary Examiner* — Thuy Dao
(74) *Attorney, Agent, or Firm* — Ditthavong & Steiner, P.C.

(57) ABSTRACT

An approach is provided for template or component-based applications. A service platform determines one or more application components preloaded on at least one device. The service platform causes, at least in part, a generation of code for at least one application. The code is at least one graph of one or more references to the application components. The service platform then causes, at least in part, a transmission of the code to the at least one device, wherein the code is processed by the at least one device to construct the application from the application components.

18 Claims, 11 Drawing Sheets

(56) References Cited

U.S. PATENT DOCUMENTS

| | | | | |
|---|---|---|---|---|
| 8,887,132 B1* | 11/2014 | Hunter | | 717/111 |
| 8,931,105 B2* | 1/2015 | Lipka et al. | | 726/26 |
| 2007/0006220 A1* | 1/2007 | Han | | 717/174 |
| 2008/0010646 A1* | 1/2008 | Kemp et al. | | 719/321 |
| 2008/0242326 A1 | 10/2008 | Hsu | | |
| 2009/0031210 A1* | 1/2009 | Backhouse | | 715/234 |
| 2009/0172657 A1* | 7/2009 | Makelainen et al. | | 717/174 |
| 2009/0254912 A1* | 10/2009 | Roundtree et al. | | 718/102 |
| 2010/0197327 A1* | 8/2010 | Boss et al. | | 455/466 |
| 2011/0264638 A1* | 10/2011 | Wong | | 707/705 |
| 2012/0102483 A1* | 4/2012 | Goldman | | 717/174 |
| 2012/0266156 A1* | 10/2012 | Spivak et al. | | 717/172 |
| 2013/0047150 A1* | 2/2013 | Malasky et al. | | 717/176 |

OTHER PUBLICATIONS

Yan et al., Fast app launching for mobile devices using predictive user context, Jun. 2012, 14 pages.*
International Search Report for corresponding Patent Application No. PCT/FI2013/050725 mailed Nov. 20, 2013, 5 pages.
International Written Opinion for corresponding Patent Application No. PCT/FI2013/050725 mailed Nov. 20, 2013, 9 pages.

* cited by examiner

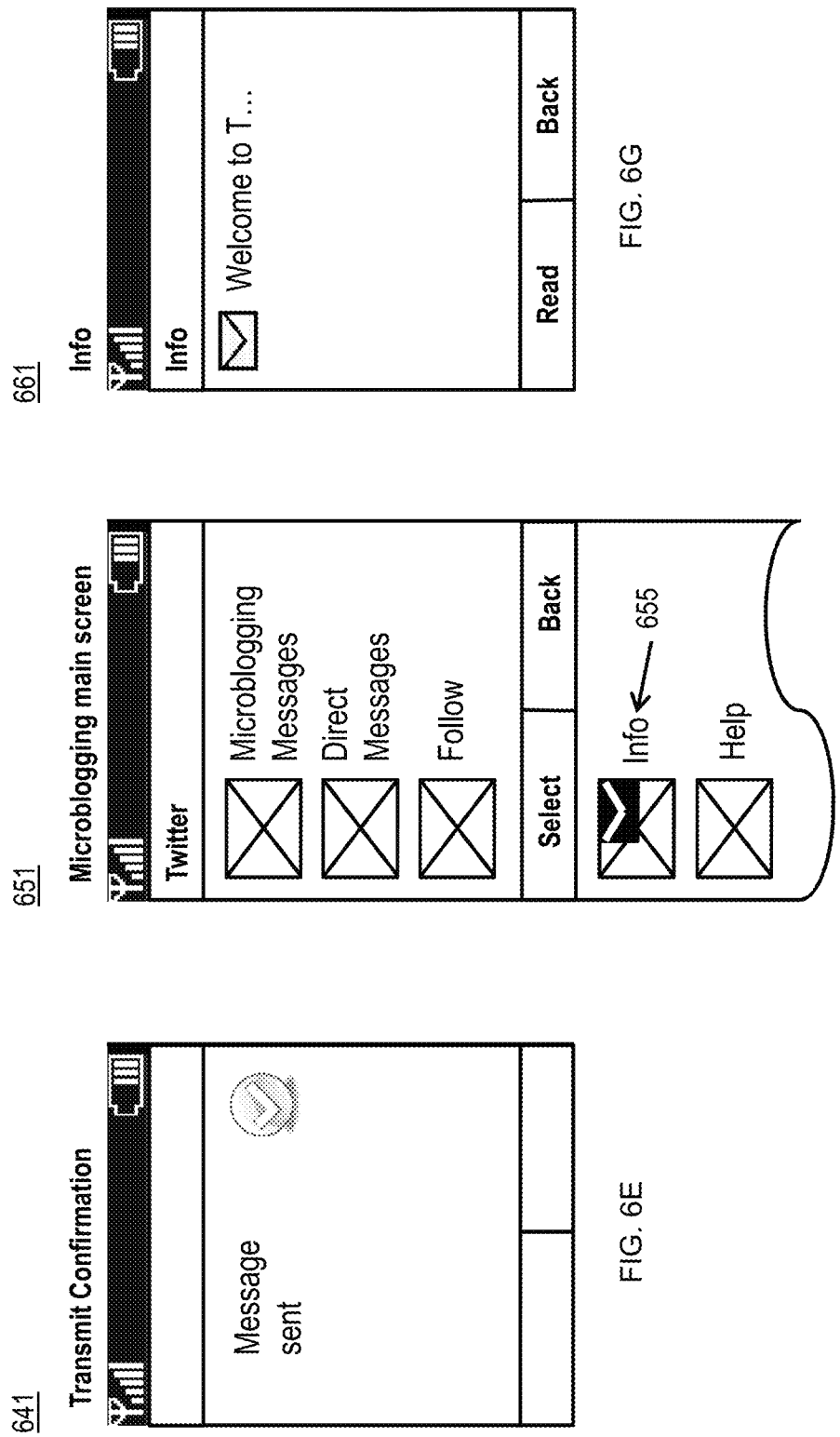

METHOD AND APPARATUS FOR PROVIDING TEMPLATE-BASED APPLICATIONS

CROSS-REFERENCE TO RELATED APPLICATION

This application claims benefit of the earlier filing date under 35 U.S.C. §119(e) of U.S. Provisional Application Ser. No. 61/679,389 filed Aug. 3, 2012, entitled "GUI Template SMS (or the like) Application System and Method" the entirety of which is incorporated herein by reference.

BACKGROUND

Service providers and device manufacturers (e.g., wireless, cellular, etc.) are continually challenged to deliver value and convenience to consumers by, for example, providing compelling network services. Many of these services include providing access to applications through, for example, an application store or market place. Such services generally require device access to the Internet. Accordingly, service providers and device manufacturers face significant technical challenges to provide users of mobile devices that do not have a data plan (e.g., data connection from their mobile device to the Internet) and/or are not data-enabled access to mobile applications.

SOME EXAMPLE EMBODIMENTS

Therefore, there is a need for an approach for providing access to mobile applications and related services to users of mobile devices that do not have a data plan and/or are not data-enabled.

According to one embodiment, a method comprises determining one or more application components preloaded on at least one device. The method also comprises causing, at least in part, a generation of code for at least one application. The code is at least one graph of one or more references to the application components. The method also comprises causing, at least in part, a transmission of the code to the at least one device. The code is processed by the at least one device to construct the application from the application components.

According to another embodiment, an apparatus comprises at least one processor, and at least one memory including computer program code for one or more computer programs, the at least one memory and the computer program code configured to, with the at least one processor, cause, at least in part, the apparatus to determine one or more application components preloaded on at least one device. The apparatus is also caused to generate code for at least one application, wherein the code is at least one graph of one or more references to the application components. The apparatus is further caused to transmit the code to the at least one device, wherein the code is processed by the at least one device to construct the application from the application components.

According to another embodiment, a computer-readable storage medium carries one or more sequences of one or more instructions which, when executed by one or more processors, cause, at least in part, an apparatus to determine one or more application components preloaded on at least one device. The apparatus is also caused to generate code for at least one application, wherein the code is at least one graph of one or more references to the application components. The apparatus is further caused to transmit the code to the at least one device, wherein the code is processed by the at least one device to construct the application from the application components.

According to another embodiment, an apparatus comprises means for determining one or more application components preloaded on at least one device. The apparatus also comprises means for generating code for at least one application, wherein the code is at least one graph of one or more references to the application components. The apparatus further comprises means for transmitting the code to the at least one device, wherein the code is processed by the at least one device to construct the application from the application components.

In addition, for various example embodiments of the invention, the following is also applicable: a method comprises receiving a code for at least one application. The code is at least one graph of one or more references to preloaded application components. The method also comprises processing the code to determine one or more preloaded application components associated with the code. The method also comprises causing, at least in part, compiling of the one or more preloaded components according to the graph to generate a user interface for the at least one application.

According to another embodiment, an apparatus comprises at least one processor, and at least one memory including computer program code for one or more computer programs, the at least one memory and the computer program code configured to, with the at least one processor, cause, at least in part, the apparatus to receive a code for at least one application, wherein the code is at least one graph of one or more references to preloaded application components. The apparatus is also caused to process the code to determine one or more preloaded application components associated with the code. The apparatus is further caused to compile the one or more preloaded components according to the graph to generate a user interface for the at least one application.

According to another embodiment, a computer-readable storage medium carries one or more sequences of one or more instructions which, when executed by one or more processors, cause, at least in part, an apparatus to receive a code for at least one application, wherein the code is at least one graph of one or more references to preloaded application components. The apparatus is also caused to process the code to determine one or more preloaded application components associated with the code. The apparatus is further caused to compile the one or more preloaded components according to the graph to generate a user interface for the at least one application.

According to another embodiment, an apparatus comprises means for receiving a code for at least one application, wherein the code is at least one graph of one or more references to preloaded application components. The apparatus also comprises means for determining one or more preloaded application components associated with the code. The apparatus further comprises means for compiling the one or more preloaded components according to the graph to generate a user interface for the at least one application.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6G are diagrams of user interfaces utilized in the processes of FIGS. 4 and 5, according to various embodiments;

DESCRIPTION OF SOME EMBODIMENTS

Examples of a method, apparatus, and computer program for providing access to mobile applications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
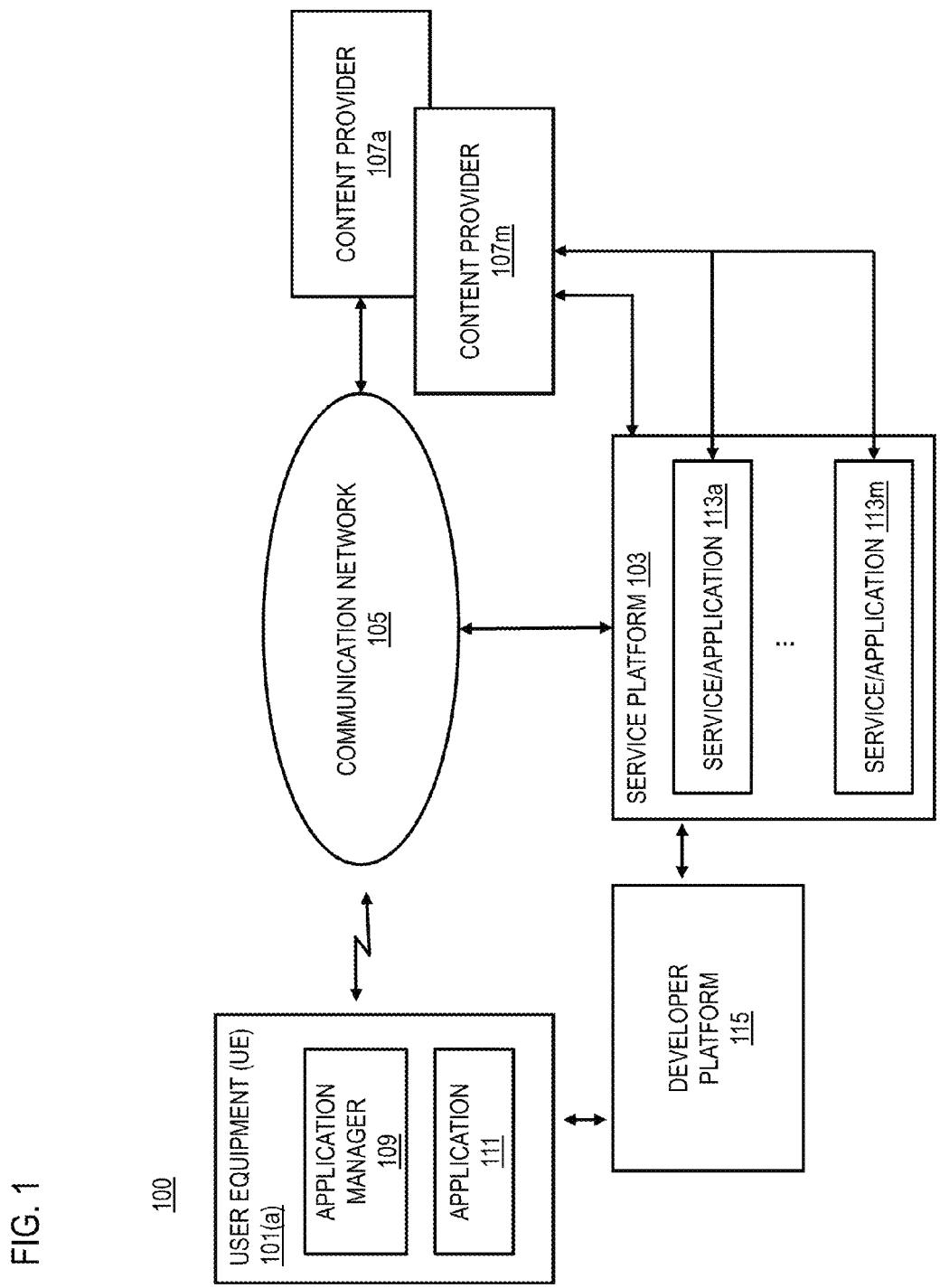
FIG. 1 is a diagram of a system capable of providing access to mobile applications to mobile devices, according to one embodiment.

FIG. 1 is a diagram of a system capable of providing access to mobile applications, according to one embodiment. Mobile devices traditionally require a data connection to the internet to access mobile applications and services associated therewith. Size (e.g., whether compiled to machine code or byte code, or compressed scripts that are expected to be executed by an interpreter that resides on the mobile device) of mobile applications, as well as the size of popular formats (e.g., HTML, RSS, and other XML and JSON data formats) used for services on the Web are generally prohibitively large for transportation over other networks or other services, such as short message services (SMS) (e.g., cannot be provided in 140-bytes SMS packages). Thus, a data connection is generally required to download mobile applications from a mobile application store or market place to a mobile device of a user, as well as the transfer of application and/or user data between mobile applications and the content provider (e.g., Facebook server, Twitter server, other 3rd party servers, etc.). However, not all mobile devices have access to the internet. Many users, such as users in developing countries, do not have a data plan and/or have mobile device incapable of a data connection (e.g., 2G only phones).

To address this problem, a system 100 of FIG. 1 introduces the capability to provide access to mobile applications to mobile devices that do not have data connections. More specifically, the system 100 provides a platform through and/or from which a mobile application can be constructed by compiling one or more preloaded application components. As used herein, the term "application component" refers to one or more components preloaded onto a user device that can be used to construct an application and related user interfaces, as well as provide general functionality associated therewith. The components may include, at least in part, one or more user interface templates, one or more resources, or a combination thereof. The term "one or more user interface templates" refers to one or more predefined visual forms that can dictate the layout of the mobile phone screen. For example, the user interface templates may include menu list(s) (e.g., single, double and triple line menu items with and without prefixed icons, and multiple choice lists), text editor(s), input form(s) (e.g., a full-screen text editor with optional prefixed text that may or may not be editable and a half screen text-input form with length and accepted character limitations), and text layout (e.g. left-indented and centered, top- and middle-aligned text, with and without embedded icons). The term "resources" refers to graphics (e.g., logos, icons, etc.), multimedia (e.g., sound, music, video, etc.), other resources available on the device (e.g., GPS (Global Positioning System); data, camera, or other sensor input) and the like. In this way, the system 100 may support graphical user information (GUI)—based applications.

In one embodiment, an application may be constructed based on a graph of one or more references to one or more application components that are available to the client platform. The graph may be associated with installation, configuration updates, new functionality (e.g., plugins), content accessible through the mobile application, among others, or a combination thereof. In this way, the system 100 can support mobile applications that are small enough to be transferred over one or more text messages.

In one embodiment, the system 100 can process a code that is a graph of one or more references to the application components. The code may be transmitted by one or more text messages. In one embodiment, the application may be constructed based on at least one transmission of the code. For example, for small mobile applications, the code for the application can fit to as little as three text messages. In another embodiment, the application may be constructed based on more than one transmission of the code. For example, for more complex mobile applications, there may be code for the core application and code for a set of plugins. In this way, code for complex mobile application can be transmitted in about three to four text messages.

In one embodiment, the transmission of code for the core application may be first transmitted and the transmission of any missing plugin may be dynamically and subsequently transmitted from the server when the user attempts to access that functionality of the application. In this way, any interaction between the mobile application and the internet-based server can be done over a few text messages.

As shown in FIG. 1, the system 100 comprises at least one user equipment (UE) 101 having connectivity to a service platform 103 via a communication network 105. As depicted in FIG. 1, the UE 101 may include or have access to at least one application manager 109, which may consist of client programs, services, or the like that may utilize the service platform 103, the services/applications 113a-113m (also collectively referred to as services/applications), content providers 107a-107m (also collectively referred to as content providers 107), the developer platform 115, or other services, applications, content, etc., available over the communication network 105.

In one embodiment, the application manager 109 may store one or more application components from which an application may be constructed. In certain embodiments, the one or more application components may be preloaded on the UE 101 and stored by the application manager 109. The application manager 109 may receive code that is a graph of one or more references to the application components from the service platform 103. The code may be transmitted from the service platform 103 in response to a user request to access and/or install an application provided by the application manager 109. The application manager 109 may construct an application from the one or more preloaded application components according to the graph.

In one embodiment, at least one application 111 may be pre-installed on the UE. The application manager 109 may store the graph of the application components for at least one interface associated with the application. The application manager 109 may be initiated to construct the application based on a user request to access and/or install the application. In certain embodiments, the application manager 109 may communicate with the service platform 103 via text messages to receive code associated with service, content and/or functionality updates.

In one embodiment, the developer platform 115 may determine the one or more application components 111 to be stored by the application manager 109 on the UE 101, one or graphs of one or more references to the application components for an application, among others, or a combination thereof.

In one embodiment, the service platform 103 may comprise the server-side components corresponding to the one or more applications 111 managed by the application manager 109 operating within the UE 101. In one embodiment, the service platform 103, the services/applications 113, the application manager 109, the developer platform 115, or a combination thereof have access to, provide, deliver, etc. one or more items associated with the content providers 107 (e.g., Facebook server, Twitter server, other 3rd party servers, etc.). In another embodiment, one or more of the content providers 107 may include the service platform 103. In other words, code is transmitted to the application manager 109 to be associated with one or more applications 111 through the service platform 103 and/or the services/applications 113a-113m.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), messaging services (e.g., short message service (SMS)), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the application manager 109 may communicate with the service platform 103, the content providers 107, or other services, applications, content, etc., without a data connection. The code may be transmitted in one or more text messages, for example, SMS messages. In another embodiment, the code may be transmitted in no more than four text messages.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the service platform 103 and the content providers 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the service platform 103 and the application manager 109 interact according to a client-server model. It is noted that the client-server model of computer process interaction is widely known and used. According to the client-server model, a client process sends a message including a request to a server process, and the server process responds by providing a service. The service process may also return a message with a response to the client process. Often the client process and the server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the term "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
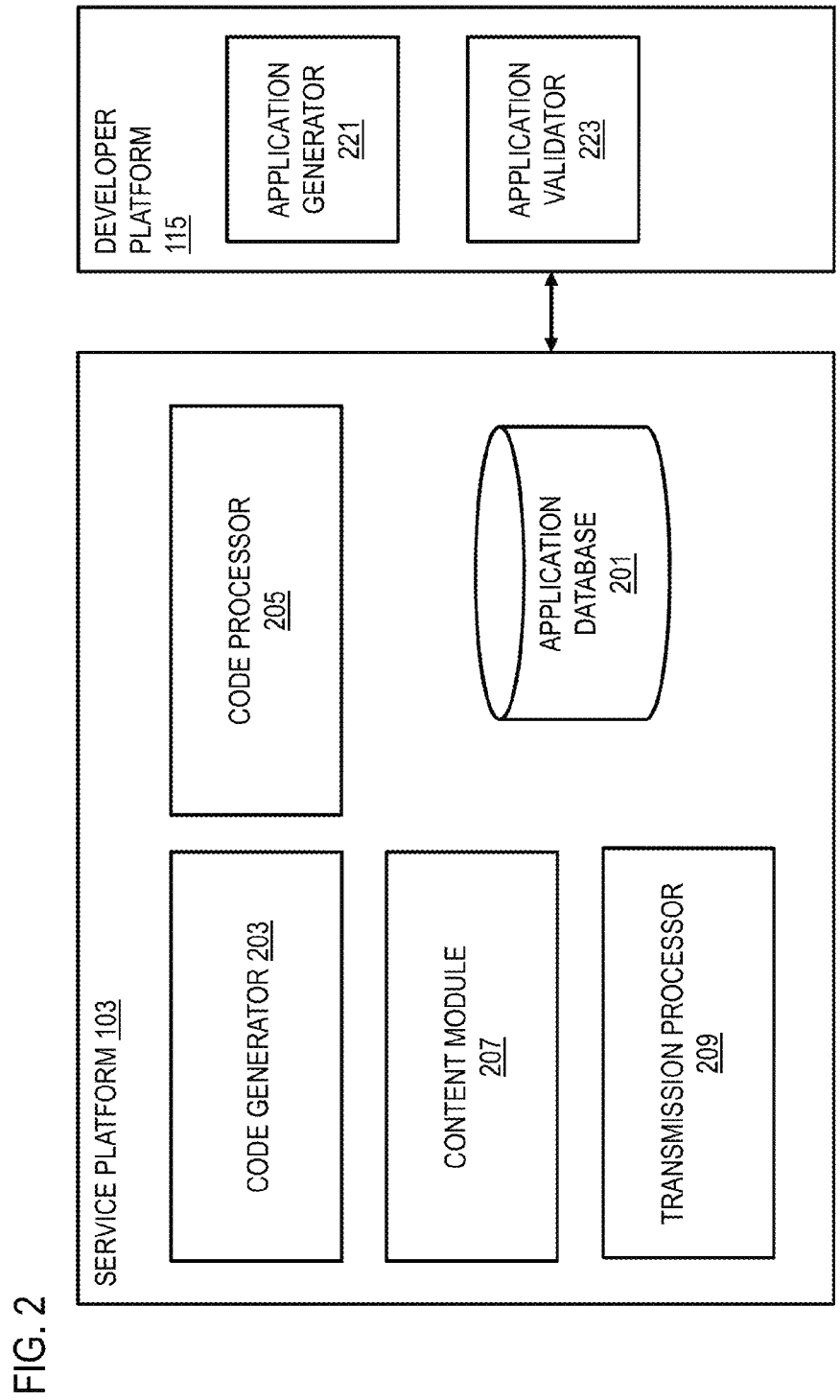
FIG. 2 is a diagram of the components of a service platform, according to one embodiment.

FIG. 2 includes a diagram of the components of a service platform 103, according to one embodiment. By way of example, the service platform 103 includes one or more components for processing code to construct one or more applications. It is contemplated that the functions of these components may be combined in one or more components or performed by other components of equivalent functionality. In this embodiment, the service platform 103 executes at least one algorithm for performing and/or coordinating the functions related to processing code to construct one or more applications.

In this embodiment, the service platform 103 includes application database storage 201, a code generator 203, a code processor 205, content module 207, and transmission processor 209. It is contemplated that all or a portion of the functions of the service platform 103 may be performed by the content providers 107.

The application database 201 may store one or more preloaded application components available on an UE. In one embodiment, the application database 201 may store one or more references to one or more application components preloaded on a UE for at least one application. In certain embodiments, at least a part of at least one graph of one or more references may be stored. The stored one or more references and/or at least a part of at least one graph may be associated with an action, for example, installation, configuration updates, new functionality (e.g., plugins), content to be presented, or a combination thereof. In certain embodiments, the stored one or more references and/or at least graph may be specific to an application. In further embodiments, information (e.g., a phone number) associated with the application may also be stored. In one embodiment, the stored preloaded application components, at least one graph and/or one or more references may be determined by the developer platform 115.

The code generator 203 may generate a code for a graph of one or more references to one or more application components preloaded on a UE to transmit to an application manager. In some embodiments, the code may be determined based on the action associated with a transmission received, for example, from an UE. In other embodiments, the code may be determined based on a configuration, content and/or functionality update to an application determined, for example, by the developer platform 115 and/or the content providers 107.

The code processor 205 may process received transmissions, for example, from the application manager 109. In one embodiment, the code processor 205 may process one or more text message(s) received from an UE to determine the action requested by the user and/or application manager 109. In certain embodiments, the code processor 205 may parse one or more text message(s) received from an UE to determine the code to generate. In another embodiment, the code processor 205 may parse one or more text message(s) received from an UE to determine a request to transmit to a content provider 107.

The content module 207 may communicate with content providers 107 to determine the code to transmit to a mobile application, for example, based on the content to be presented.

The transmission processor 209 may process transmissions received, transmitted, or a combination thereof. In one embodiment, the transmission processor 209 may process transmissions received from the application manager 109.

In one embodiment, the transmission processor 209 may process transmission received from and/or to be transmitted to a content provider. The transmission processor 209 may act as an intermediary between the application manager 109 and the content providers 107. For example, the content providers 107 may not have the capability to process transmissions received from the application manager 109 and/or generate code associated with a set of actions to be transmitted to the application manager 109 for an application.

In one embodiment, for codes to transmitted to an UE, the transmission processor 209 may determine the number from which the code to be transmitted. The phone number may be based on the application to receive the code. In certain embodiments, each phone number may be associated with a different application.

Figure 3:
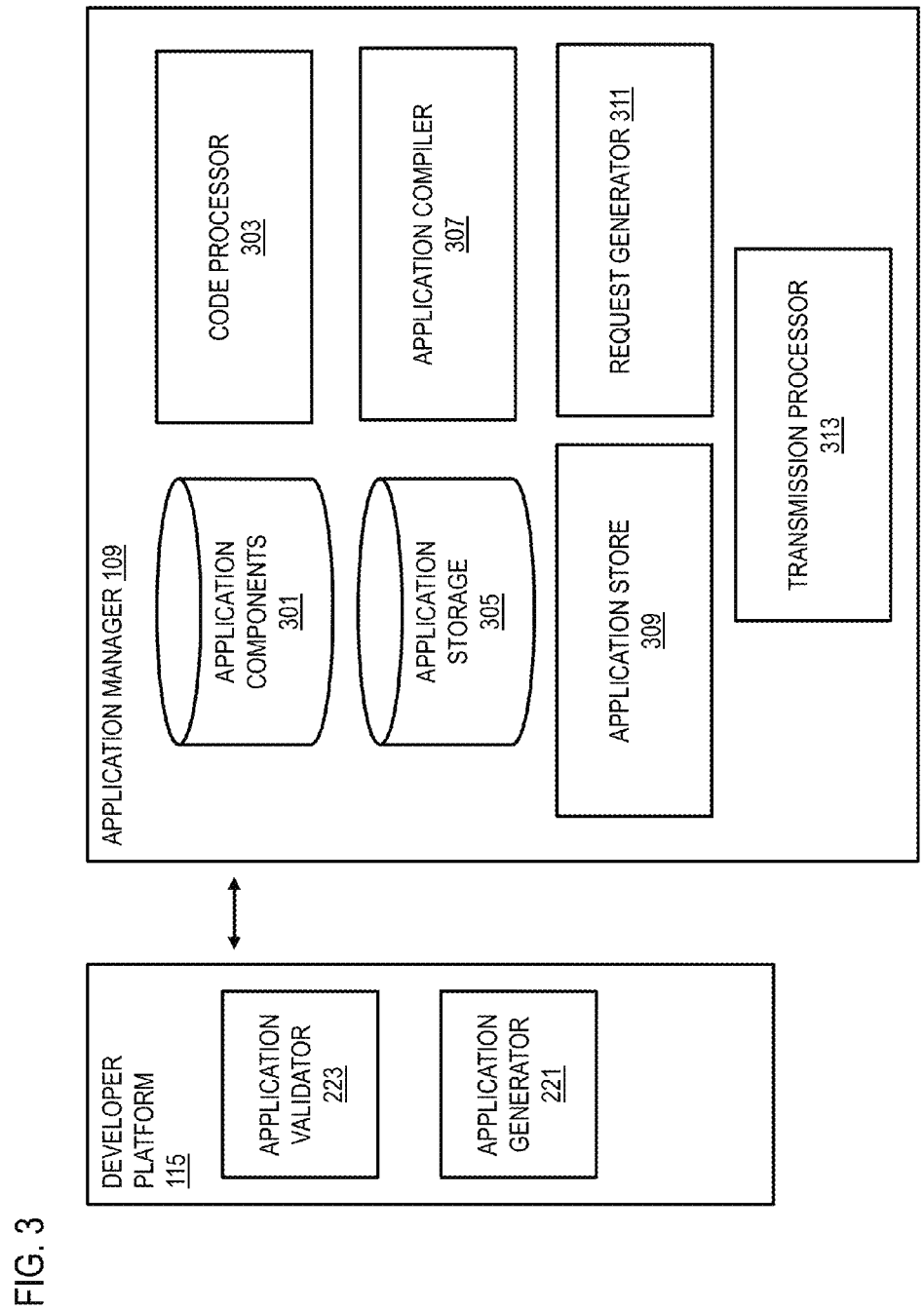
FIG. 3 is a diagram of the components of an application manager, according to one embodiment.

FIGS. 2 and 3 include a diagram of components of the developer platform 115, according to one embodiment. By way of example, the developer platform 115 includes one or more components for determining code to construct one or more applications. It is contemplated that the functions of these components may be combined in one or more components or performed by other components of equivalent functionality. In this embodiment, the developer platform 115 executes at least one algorithm for performing and/or coordinating the functions related to determining code to construct one or more applications.

In this embodiment, the developer platform 115 includes at least an application generator 221 and an application validator 223. It is contemplated that all or a portion of the functions of the developer platform 115 may be performed by the content providers 107 and/or the service platform 103.

In one embodiment, the application generator 221 may determine at least one application component from which an application, including new user interfaces associated with the application, may be constructed. In certain embodiments, the application generator 221 may determine at least one application component to be preloaded on the UE 101. In certain embodiments, the application generator 221 may determine the code that causes the application manager 109 to generate the application and/or user interface associated with the application.

In one embodiment, the application validator 223 may validate the at least one application component and/or the code. In one embodiment, after the at least one application component is validated, the application component may be preloaded onto the UE 101. In another embodiment, after the code is validated, the code may be transmitted and/or stored on the service platform 103 and/or the application manager 109.

FIG. 3 includes a diagram of components of the application manager 109 provided on the UE 101, according to one embodiment. By way of example, the UE 101 includes one or more components for constructing an application. It is contemplated that the functions of these components may be combined in one or more components or performed by other components of equivalent functionality. In this embodiment, the application manager 109 executes at least one algorithm for performing and/or coordinating the functions related to processing received code to construct one or more applications.

In this embodiment, the application manager 109 includes application components storage 301, code processor 303, application storage 305, application compiler 307, application store 309, request generator 311, and transmission processor 313.

The application components storage 301 may store at least one application component. In one embodiment, at least a part of the application components storage 301 may be preloaded. For example, one or more application components stored in the application components storage 301 may be preloaded on the UE 101. In certain embodiments, the application components storage 301 may further store a set of action associated with at least one application component. For example, the actions may include a transition from one application component to another application component, exit transition, as well as any other transition, or a combination thereof. The transition may be associated with associated sub-actions, such as handling the content stored in the mobile application memory, updating the mobile application configuration values, sending a text message with a specific payload at specific access number.

The code processor 303 may process codes, for example, received from the service platform 103 by at least one text message. The code processor 303 may parse the received code to determine the graph of the one or more references to the application components, thereby, for example, determining the action(s) associated with the code. In one embodiment, the code processor 303 may process the code through a number of filters. The filters may be sequenced in priority order and the first matching filter may determine the associated action(s). For example, the actions may include the application storage 305 in which the received code may be stored, the configuration that will be updated, a plugin to be installed, or a combination thereof. In certain embodiments, if there is no match to the received code, the text message may be discarded as a corrupted message.

The application storage 305 may include at least one memory storage for storing received content. In one embodiment, the application storage 305 may include a number of different storages (e.g., inboxes") for storing received content, e.g., received code. In certain embodiments, each storage may be associated with a different filter. The storage(s) may be defined by a mobile application. By storing the code locally, the code may be retrieved when the UE 101 is off-line.

The application compiler 307 may compile at least one application component to construct a mobile application and/or a user interface associated with the mobile application. In certain embodiments, the application compiler 307 may compile at least one application component according to the received and/or stored code. In further embodiments, the application compiler 307 may compile at least one application component to construct an application based on one or more actions associated with the at least one application component. The application compiler 307 may retrieve the code stored in the application storage 201, for example, when the user attempts to access functionality of the application that belongs to the missing plugin.

The application store 309 may provide a list of one or more mobile applications available to the user of the UE 101. The application store 309 may be stored locally on the UE 101 so that the list may be viewed off-line. In one embodiment, the one or more mobile applications may only include the mobile applications supported by the UE 101, the application manager 109, and/or operator of the UE 101. In other embodiments, the application store 309 may determine whether the mobile application is supported by the UE 101, the application manager, and/or the operator of the UE 101. For example, after an application is launched from the application store 309, the configuration data that indicate a list of operators supporting the mobile application in that geographic area and the user's operation information that can be retrieved from the SIM card of the UE to determine whether the application is supported.

The request generator 311 may generate a request to be transmitted to the service platform 103 and/or the content provider 107 based on the action requested for a mobile application. In one embodiment, the request generator 311 may generate at least one text message to be transmitted to the service platform 103 and/or the content provider 107. For example, if a user selects a box requesting a username after the application has been initialized, the request generator 311 generates a request to the service platform 103 to be transmitted by text message with that username. This way the application manager 109 may communicate with the service platform 103 and/or the content provider 107 without a data connection, for example, by text messaging.

The transmission processor 313 may process transmissions received, transmitted, or a combination thereof. In one embodiment, the transmission processor 313 may process transmissions received from the service platform 103 and/or the content providers 107. The transmission processor 313 may process received text message(s) according to sender information. The received message(s) may be transmitted to a specific port. If the received message(s) are not transmitted to a specific port, the transmission processor 313 may determine the sender number and check the sender number against a list of stored sender numbers associated with the mobile applications provided on the UE 101. If a match is found, the transmission processor 313 may cause the mobile application associated with the sender information to receive the transmission. If no match is found the transmission processor 313 may be discarded.

In one embodiment, the transmission processor 313 may cause at least one text message to be transmitted the service platform 103 and/or the content providers. The at least one text message may be transmitted to a specific access number, for example, a number associated with the mobile application. The at least one text message may include data embedded in the originating application component, data embedded in previous application components, user input that has been collected, one or more application configuration parameter values, at least a part of data stored on the UE 101 (e.g., which has been processed by the application components).

Figure 4:
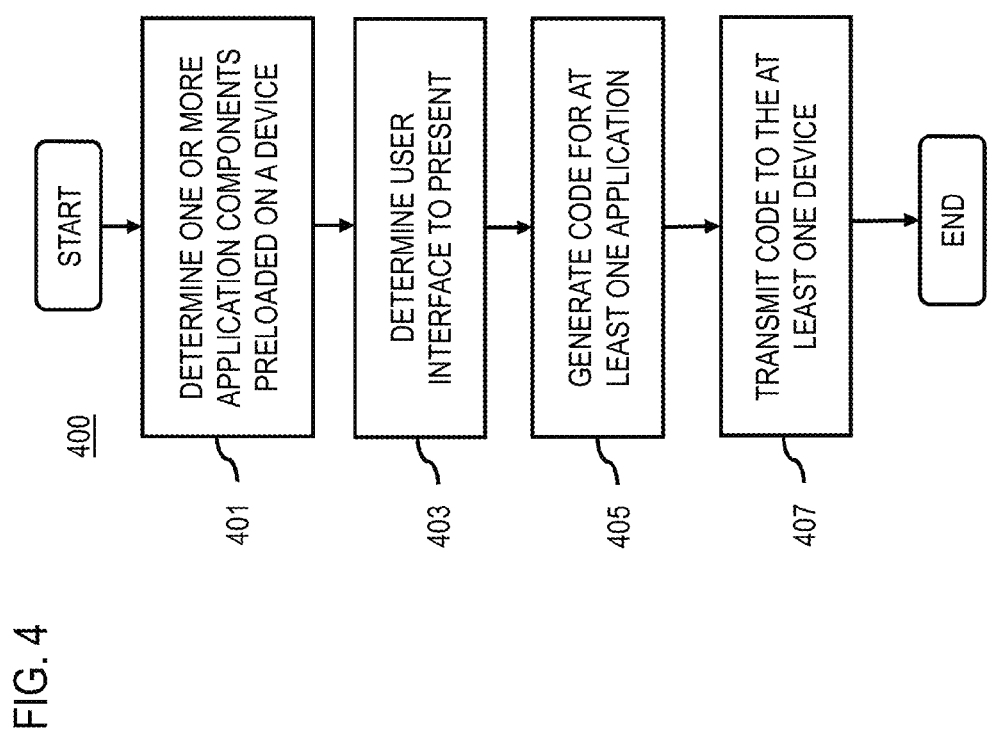
FIG. 4 is a flowchart of a process for generating and transmitting code for an application to a mobile device, according to one embodiment.
Figure 8:
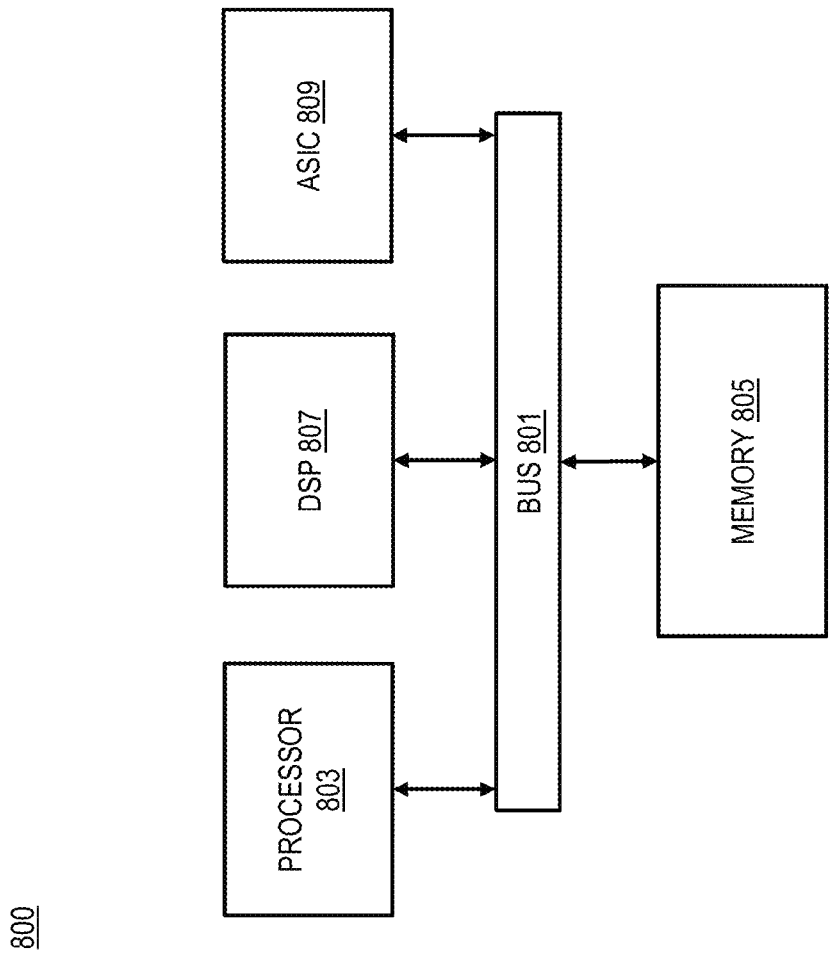
FIG. 8 is a diagram of a chip set that can be used to implement an embodiment of the invention.

FIG. 4 is a flowchart of a process for determining code from which an application may be constructed according to one embodiment. In one embodiment, the service platform 103 performs the process 400 and is implemented in, for instance, a chip set including a processor and a memory as shown in FIG. 8. In addition or alternatively, the content providers 107 and/or the developer platform 115 may perform all or a portion of the process 400. In step 401, the service platform 103 determines one or more application components preloaded on a UE. As noted, the one or more application components may be determined by the developer platform 115 or may be determined by accessing the application database 201.

The service platform 103 then determines at least one user interface associated with a mobile application to present (step 403). In one embodiment, the user interface to be presented may be based on a received request from the application manager 109 and/or an update, e.g., in conduct and/or functionality, received from, example, the content providers 107.

In step 405, the service platform 103 determines the code associated with the user interface. As noted, the code is a graph of one or more references to the application components preloaded on the UE 101 and that can be processed by the UE 101 to construct the application from the application components. Next, the service platform 103 transmits the code to the UE 101 (step 407).

Figure 5:
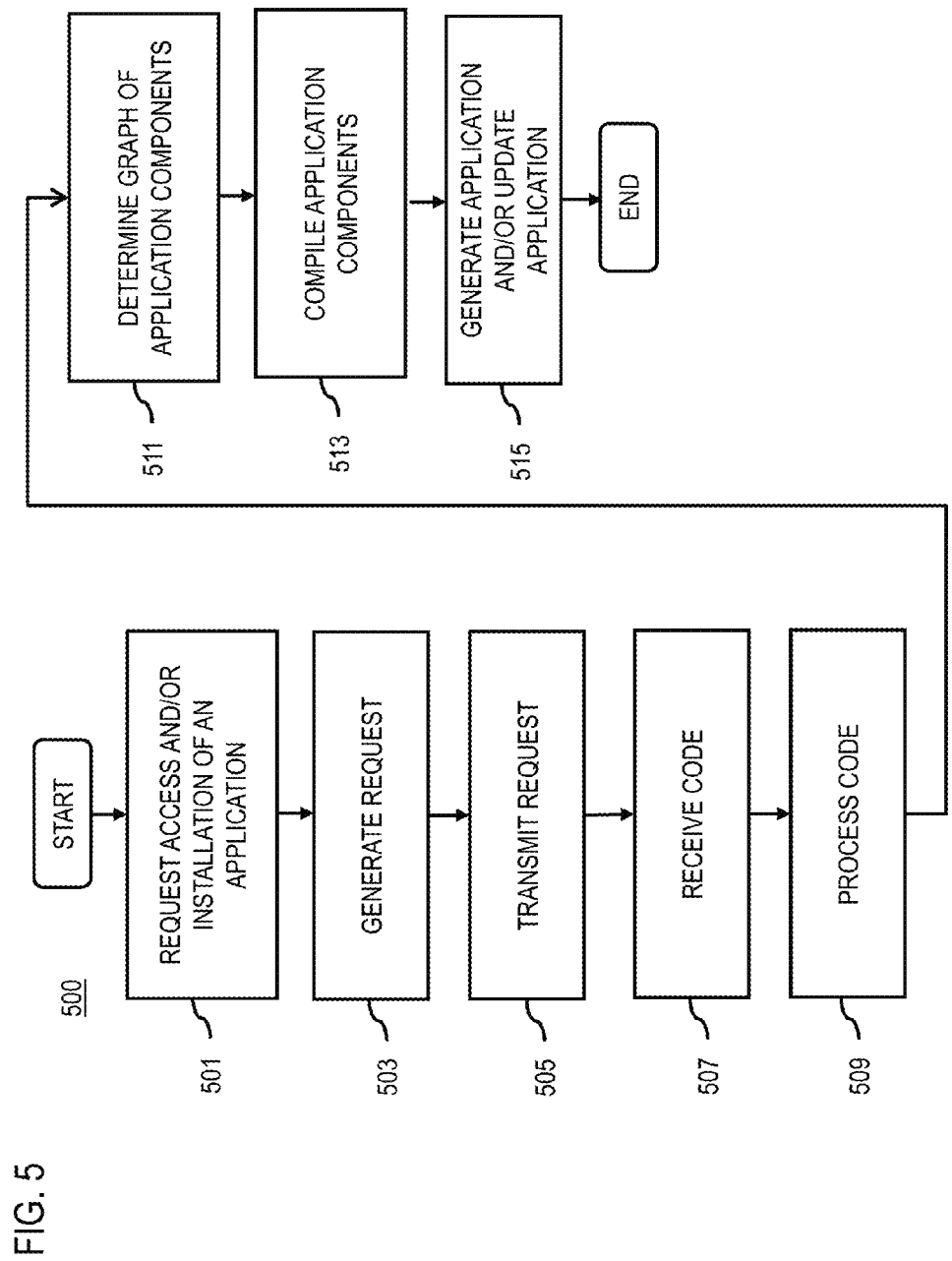
FIG. 5 is a flowchart of a processing for generating a mobile application on a mobile device, according to one embodiment.

FIG. 5 is a flowchart of a process for constructing an application from one or more preloaded application components according to one embodiment. In one embodiment, the application manager 109 performs the process 500 and is implemented in, for instance, a chip set including a processor and a memory as shown in FIG. 8. In step 501, the application manager 109 receives a user request to access and/or install a mobile application, for example, an application provided by the application store 309. If the request cannot be completed locally (e.g., the plug-in for the new functionality is not stored locally in the application's in-box (e.g., application database 305), the application manager 109 generates a request (e.g., at least one text message) to be transmitted to the service platform 103 and/or content providers 107 requesting the code associated with the access and/or installation of the application (step 503). The request may include a predefined message and may be transmitted to a predefined sender phone number. The code is then transmitted to the service platform 103 and/or the content providers 107 (step 505).

The application manager 109 receives at least one text message that includes the code, for example, from the service platform 103 and/or the content providers 107 (step 507). Next, the application manager 109 processes the code (step 509). The application manager 109 may determine the mobile application registered with the sender information, if the text message(s) were not sent to a specific port. As noted, if the application manager 109 determines that the message is not registered with sender information, the application manager 109 may discard the message and code. After the code is associated with the mobile application, the application manager 109 processes the code, for example, through a series of filters associated with the mobile application, to determine the application store 305 to store the message and/or code. By processing the code, the application manager 109 determines the graph of one or more references of the application components (step 511).

Next, the application manager 109 compiles the application components according to the graph (step 513). The application manager 109 then constructs the application from the application components (step 515). The application manager 109 may then cause the user interface associated with the application to be displayed on the UE 101.

Figure 6A:
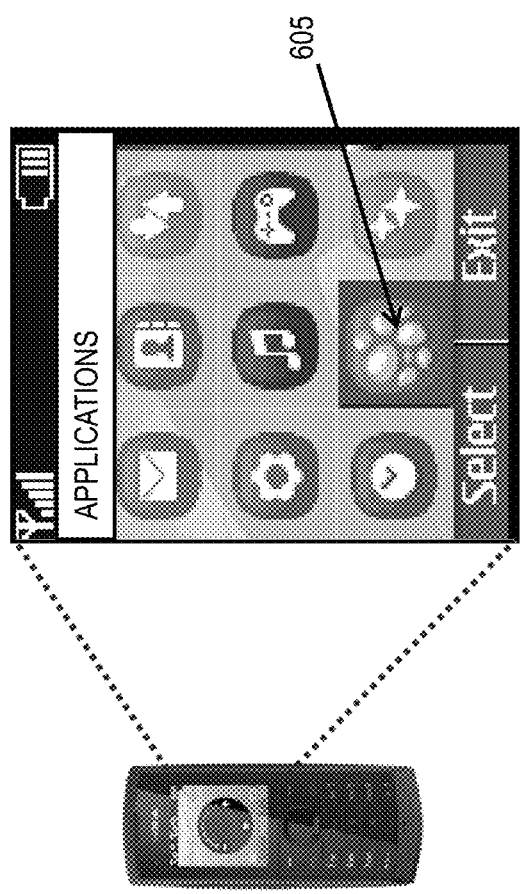

FIGS. 6A-6G are diagrams of user interfaces utilized in the processes of FIGS. 4 and 5, according to various embodiments. FIG. 6A depicts a user interface (UI) 601 that presents an application store for providing access to mobile applications for devices that do not have data plans and/or incapable of having a data connection. In this example, a user selected an icon 605 representing a mobile application store.

Figure 6D:
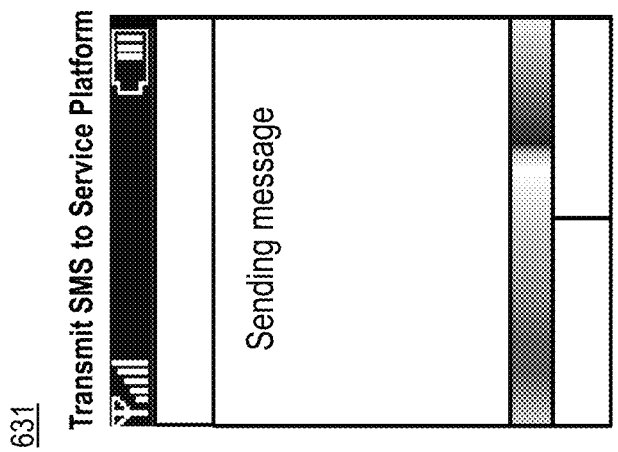
Figure 6C:
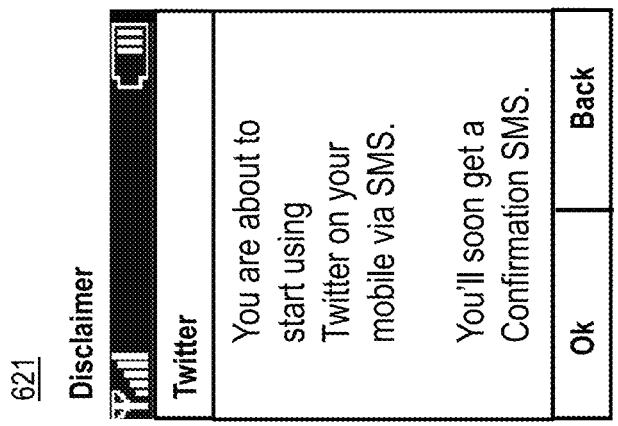
Figure 6B:
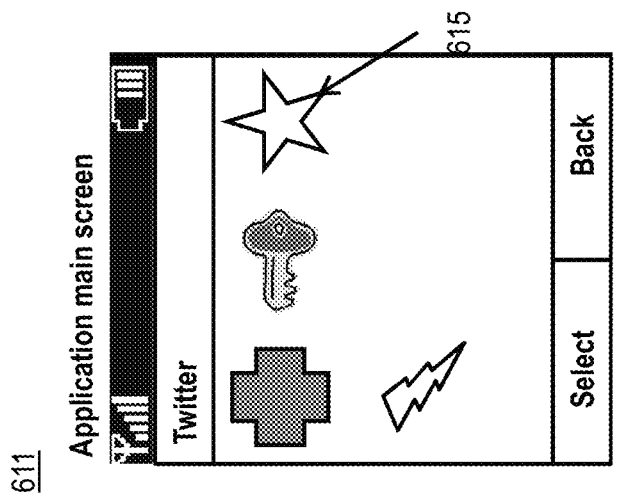

In one embodiment, as shown UI 611 in FIG. 6B, after accessing the mobile application store, a user may select a mobile application to install. In this example, the user selected an icon 615 representing a microblogging application (e.g., Twitter). FIG. 6C shows an example of an UE 621 displaying a disclaimer associated with first time use of the application. In this example, the application manager 109 determined that the microblogging application is supported by the user's operator and that this is the first time, the microblogging application has been run. Also, in this example, the disclaimer interface was generated based on a graph of application components that were stored by the application manager 109. FIGS. 6D and E shows examples of UE 631 and 641 displaying the automatic transmission and confirmation of the transmission to, for example, microblogging services and/or the service platform 103, to initialize the access to the service from this mobile application upon acceptance of the disclaimer. FIG. 6F shows an UE 651 in which the microblogging application received the message based on the sender message. The application manager 109 received a message from the microblogging services and/or the service platform 103 and processed it to generate the new message and determine the inbox in which the message should be stored. The microblogging application provides a notification that new content has been received, for example, by displaying a badge 655 on the "Info" inbox. FIG. 6G shows an UE 661 that includes the message provided in the inbox. In this example, the message is a welcome message providing instructions about how to login into to the service or to create a new account. The welcome message was generated based on the code received by the service platform 103 and/or the Microblogging services.

The processes described herein for providing access to mobile applications may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
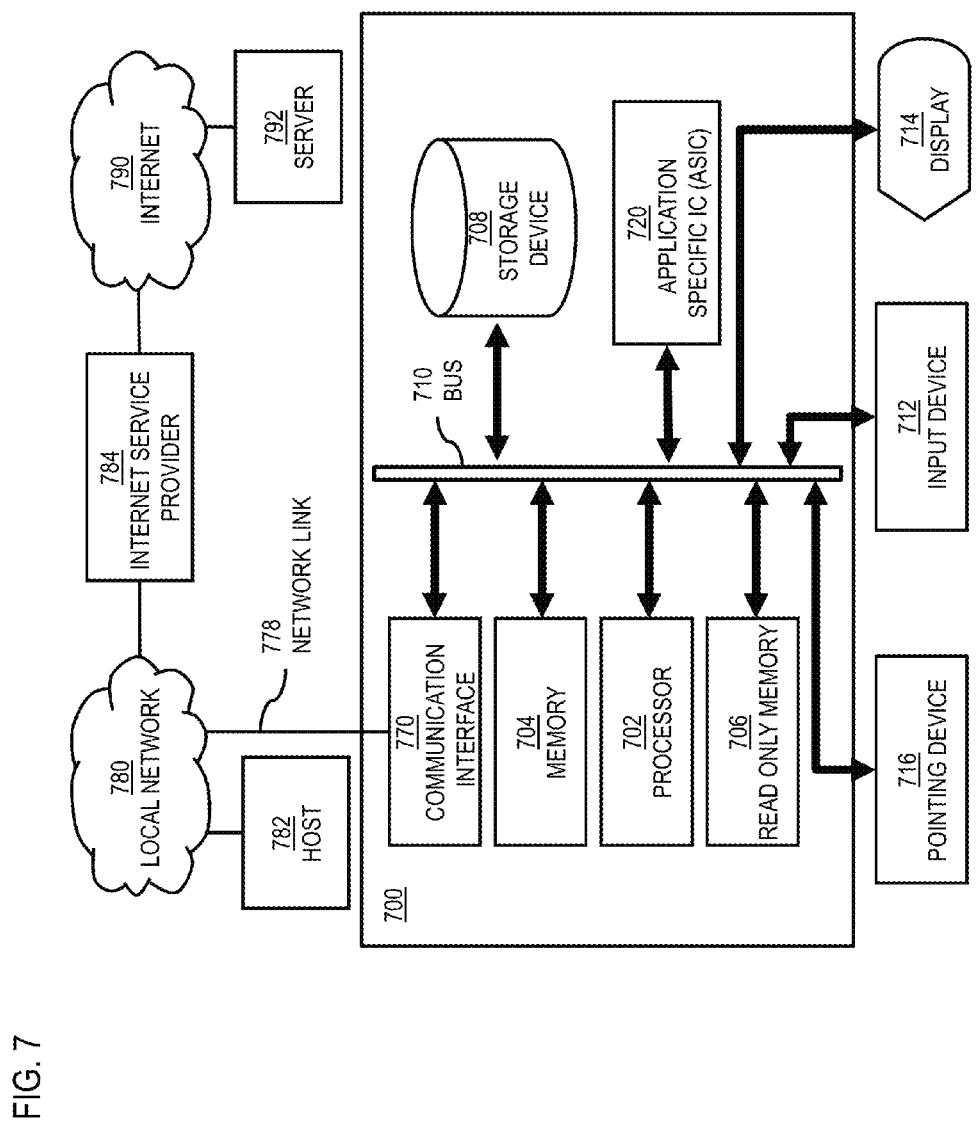
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide access to mobile application(s) as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing access to mobile application(s).

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide access to mobile application(s). The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing access to mobile application(s). Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing access to mobile application(s), is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing access to mobile application(s) to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide access to mobile application(s) as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing access to mobile application(s).

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide access to mobile application(s). The memory 805 also stores the data associated with or generated by the execution of the inventive steps.

Figure 9:
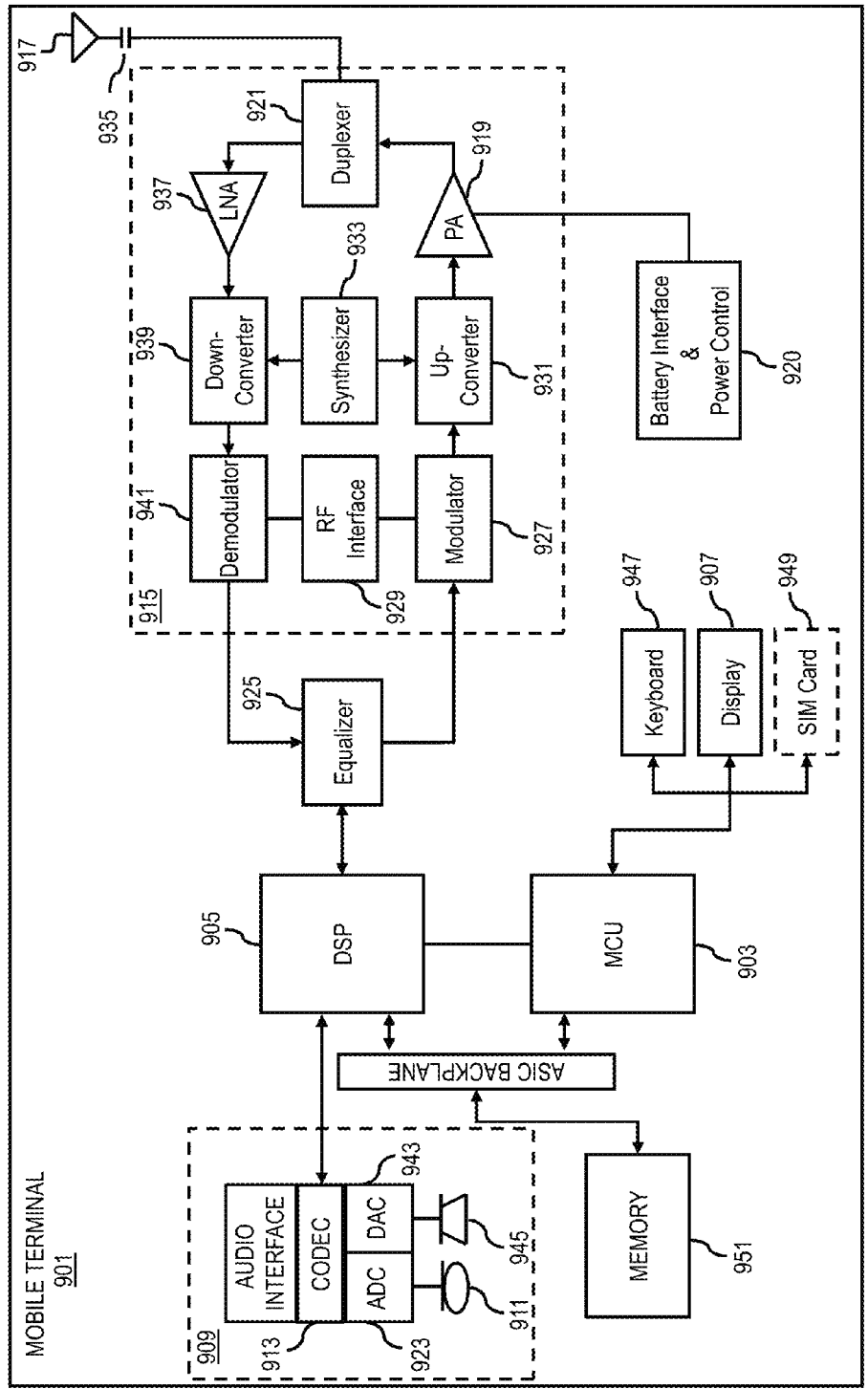
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing access to mobile application(s). Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing access to mobile application(s). The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911.

The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide access to mobile application(s). The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A processor-executed method comprising facilitating a processing of and/or processing (1) data and/or (2) information and/or (3) at least one signal, the (1) data and/or (2) information and/or (3) at least one signal based, at least in part, on the following:
one or more application components preloaded on at least one device;
a generation of code for constructing at least one application, wherein the code is at least one graph of one or more references to the one or more application components; and
a transmission of the code to the at least one device,
wherein the transmission of the code to the at least one device includes code for a core application first transmitted to the at least one device, wherein code for any missing plugin is dynamically and subsequently transmitted to the at least one device upon access to that functionality of the at least one application that belongs to the missing plugin, and wherein the code is processed including compiled by the at least one device to construct the at least one application from the one or more application components, the at least one application comprising the one or more application components.

2. A method of claim 1, wherein the transmission of the code is via one or more text messages.

3. A method of claim 1, wherein the one or more application components include, at least in part, one or more user interface templates, one or more resources, or a combination thereof.

4. A method of claim 1, wherein the (1) data and/or (2) information and/or (3) at least one signal are further based, at least in part, on the following:
  a request to install and/or access the at least one application;
  wherein the transmission of the code is in response to the request.

5. A method of claim 1, wherein the (1) data and/or (2) information and/or (3) at least one signal are further based, at least in part, on the following:
  a transmission of the code to the at least one device, wherein the code is processed by the at least one device to construct at least one plug-in for the at least one application from the application components.

6. A processor-executed method comprising facilitating a processing of and/or processing (1) data and/or (2) information and/or (3) at least one signal, the (1) data and/or (2) information and/or (3) at least one signal based, at least in part, on the following:
  a receiving of a code for at least one application, wherein the code is at least one graph of one or more references to one or more preloaded application components;
  a processing of the code to determine the one or more preloaded application components associated with the code,
  wherein receiving of the code for at least one application includes code for a core application first received,
  wherein code for any missing plugin is dynamically and subsequently received upon access to that functionality of the at least one application that belongs to the missing plugin; and
  a compiling of the one or more preloaded application components according to the at least one graph to generate the at least one application.

7. A method of claim 6, wherein the code is received via one or more text messages.

8. A method of claim 6, wherein the one or more preloaded application components include, at least in part, one or more user interface templates, one or more resources, or a combination thereof.

9. A method of claim 6, wherein the code is received in response to a request with respect to access and/or installation of the at least one application.

10. An apparatus comprising:
  at least one processor; and
  at least one memory including computer code for one or more programs,
  the at least one memory and the computer program code configured to, with the at least one processor, cause the apparatus to perform at least the following:
  determine one or more application components preloaded on at least one device;
  cause, at least in part, a generation of code for constructing at least one application, wherein the code is at least one graph of one or more references to the one or more application components; and
  cause, at least in part, a transmission of the code to the at least one device,
  wherein the transmission of the code to the at least one device includes code for a core application first transmitted to the at least one device,
  wherein code for any missing plugin is dynamically and subsequently transmitted to the at least one device upon access to that functionality of the at least one application that belongs to the missing plugin, and
  wherein the code is processed including compiled by the at least one device to construct the at least one application from the one or more application components, the at least one application comprising the one or more application components.

11. An apparatus of claim 10, wherein the transmission of the code is via one or more text messages.

12. An apparatus of claim 10, wherein the one or more application components include, at least in part, one or more user interface templates, one or more resources, or a combination thereof.

13. An apparatus of claim 10, wherein the apparatus is further caused to:
  determine a request to install and/or access the at least one application;
  wherein the transmission of the code is in response to the request.

14. An apparatus of claim 10, wherein the apparatus is further caused to:
  cause, at least in part, a transmission of the code to the at least one device, wherein the code is processed by the at least one device to construct at least one plug-in for the at least one application from the one or more application components.

15. An apparatus comprising:
  at least one processor; and
  at least one memory including computer code for one or more programs,
  the at least one memory and the computer program code configured to, with the at least one processor, cause the apparatus to perform at least the following:
  receive a code for constructing at least one application, wherein the code is at least one graph of one or more references to one or more preloaded application components;
  process and/or facilitate a processing of the code to determine the one or more preloaded application components associated with the code,
  wherein receiving the code for constructing at least one application includes code for a core application first received,
  wherein code for any missing plugin is dynamically and subsequently received upon access to that functionality of the at least one application that belongs to the missing plugin; and
  cause, at least in part, a compiling of the one or more preloaded components according to the at least one graph to generate the at least one application, the at least one application comprising the one or more preloaded application components.

16. An apparatus of claim 15, wherein the code is received via one or more text messages.

17. An apparatus of claim 15, wherein the one or more preloaded application components include, at least in part, one or more user interface templates, one or more resources, or a combination thereof.

18. An apparatus of claim 15, wherein the code is received in response, to at least, a request with respect to access and/or installation of the application.

* * * * *